Sept. 17, 1940.   R. R. McGREGOR ET AL   2,215,048
MORTAR-BONDED GLASS AND THE LIKE STRUCTURE
Filed April 18, 1939
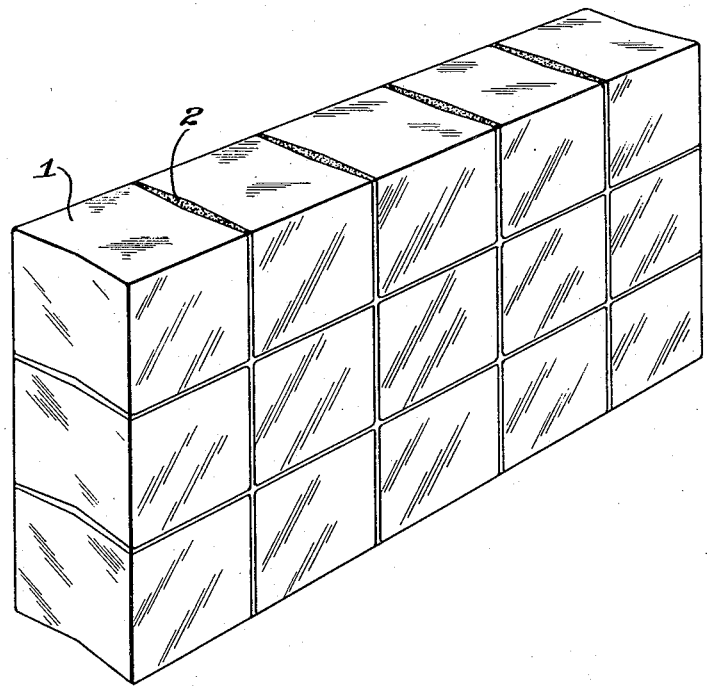
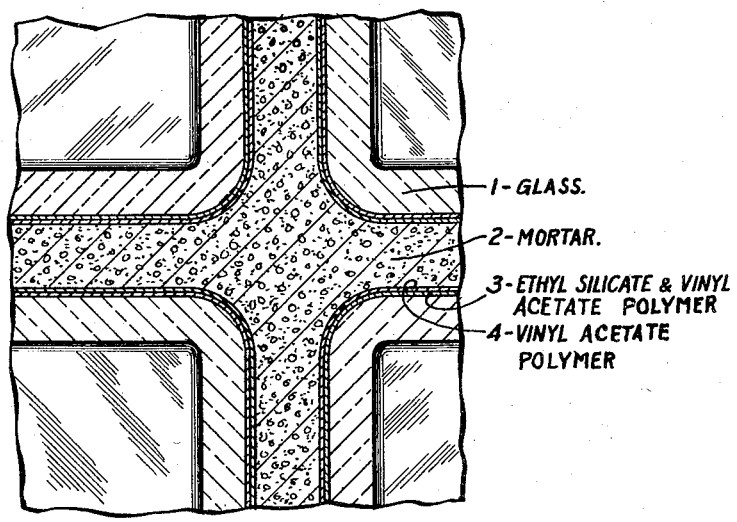

Patented Sept. 17, 1940

2,215,048

UNITED STATES PATENT OFFICE 2,215,048

MORTAR-BONDED GLASS AND THE LIKE STRUCTURE

Rob R. McGregor, Swissvale, and Earl L. Warrick, West View, Pa., assignors to Corning Glass Works, Corning, N. Y., a corporation of New York Application April 18, 1939, Serial No. 268,640

13 Claims. (Cl. 72—37)

This invention relates to structures made from articles having a mortar bond between surfaces that are of glass or other vitrified material, i. e., glazed, and more particularly to mortar-bonded structures of glass blocks or other structural glass forms.

The adherence of mortar to glass or other vitrified, or glazed, surfaces, for instance to glass blocks, is much more variable than in the case of ordinary unglazed brick and similar porous bodies. Consequently, erratic results are obtained when it is attempted to lay up a glass block wall structure with mortar because the mortar may or may not adhere well, and ordinarily it is impossible to predict the result which will be obtained. The reasons for these variations are not certainly known although it seems that the adherence is affected by the water content of the mortar as well as by the time allowed to elapse between laying down the mortar and placing the glass upon it. Such structures are additionally unsatisfactory because the bond between mortar applied directly to glass or other glazed surface is not resistant to heat shock.

It has been found that if the glass or other glazed mortar-bearing surface is first provided with a coating of an appropriate lacquer made from synthetic resin, not only are more consistent bond strengths obtained, but also the bond is less susceptible to heat shock than is a direct glass-mortar bond. Various types of lacquers may be used for this purpose, either thermosetting or thermoplastic, although as far as we are aware the best bond strengths have been obtained with such thermoplastic resins as the acrylates, methacrylates and polyvinyl resins, particularly the polyvinyl acetates. Experience has shown, however, that such lacquers rapidly lose their adhesion to the glass in the presence of moisture, which introduces practical difficulties in the application of this solution of the problem. Thus, if the lacquer film becomes wet before the block is laid up with mortar the resultant reduced adhesion to the glass may cause the coating to be partially or wholly removed from the block during handling, with consequent unsatisfactory bond strength in the assembled structure. Again, the adherence of the lacquer to the glass may become weakened in the finished structure due to continuous or intermittent exposure to moisture, with weakening of the bond strength.

It is among the objects of this invention to mortar bond structural glass articles, such as glass blocks or tiles, and other articles or units having at least their contiguous, or mortar-bearing, surfaces glazed in such manner as to provide a sustained strong bond between the mortar and the structural unit which is not substantially affected by moisture, is cheap and easily provided, and in which the difficulties referred to hereinabove are repressed or eliminated.

A further object is to provide glass and other articles having glazed mortar-bearing surfaces with a coating which adheres satisfactorily to the face under both dry and wet conditions, and to which mortar bonds strongly and satisfactorily, and also to provide a coating material for producing such a coating.

Other objects will appear from the following description.

The invention will be described with particular reference to the accompanying drawing in which Fig. 1 is a perspectve view of a mortar-bonded wall built from glass blocks, and Fig. 2 a fragmentary sectional view, on an enlarged scale, at the corner formed by four blocks in Fig. 1.

The invention is applicable, as noted above, to the mortar bonding of articles having at least their contiguous faces glazed. It is predicated upon our discovery that its stated objects are attained by providing the mortar-bearing faces with a two-layer coating comprising a layer of hydrolyzed silicate ester applied directly to the glass, and an overlying layer of vinyl acetate polymer to which the mortar is applied. We have found that such duplex, or two-layer, coatings adhere satisfactorily to glass and the like surfaces under both wet and dry conditions, that they form a strong and satisfactory bond with mortar, and that they overcome the difficulties which have heretofore confronted the art in the mortar-bonding of such articles into structures.

We have found also, by actual experience, that unsatisfactory results attend the use of a coating consisting of a single layer of hydrolyzed silicate ester, apparently because the mortar does not adhere satisfactorily thereto, and that to obtain the results which characterize the invention, i. e., adequate wet adherence to the glass coupled with satisfactory mortar bond strength, the hydrolyzed silicate ester layer must be covered with a layer of vinyl acetate polymer, whereby each layer of the two-layer coating described is essential to the invention.

In the preferred practice of the invention alkyl silicates are used to supply the hydrolyzed silicate ester layer, and most suitably ethyl silicate. Various other alkyl esters may be used such, for example, as methyl silicate or those of the higher alcohols. However, the hydrolysis of the methyl ester may be difficult to control, and although the higher esters can be hydrolyzed satisfactorily their proportional content of silica decreases as the molecular weight increases so that they are not as economical to use as those containing higher proportions of silica. For most purposes it is preferred, for the reasons noted, to use ethyl silicate because its hydrolysis can be effected and controlled readily, because it is readily available, and because it contains a relatively high proportion of silica.

An essential feature of the invention is that the silicate ester is hydrolyzed to prepare it for application to the glazed surface. As will be understood by those familiar with such matters, this may be accomplished by various procedures, but by way of illustration a satisfactory hydrolyzing practice is to mix 100 parts by weight of ethyl silicate, 100 parts by weight of 95 per cent ethyl alcohol, and 10 parts by weight of water. To this mixture there is added a small amount of acid, suitably one-half part by weight of a solution of 1 part of hydrochloric acid in 100 parts of water. The mixture is then boiled under a reflux condenser for one hour. Other proportions may, of course, be used.

In the practice of the invention the hydrolyzed ethyl silicate is applied directly to the glass or other glazed surface to form a coating thereon. This layer may consist of hydrolyzed ethyl silicate, which when applied to glass dries to a solid film, but in that case the best results are obtained by applying the outer layer of vinyl acetate polymer to the ethyl silicate layer just as the tackiness of the latter is disappearing. Such practice is obviously disadvantageous from a commercial production standpoint. The use of hydrolyzed ethyl silicate alone may cause difficulties also in that after a length of time which appears to be dependent upon the amount of water present during hydrolysis, films on rigid surfaces may craze or crack. For these reasons it is preferable to plasticize the hydrolyzed silicate film, and this may be accomplished by the use of any suitable plasticizer which will inhibit crazing and cracking of the film upon standing and which will not detrimentally affect the adherence of the film to the glass and to the overlying vinyl acetate film.

We have discovered that particular advantages attend the use of vinyl acetate polymer as a plasticizer of the hydrolyzed ethyl silicate film. Not only does it adequately plasticize the film of hydrolyzed ethyl silicate, but also, and this is of particular advantage, it is unnecessary to apply the outer layer of vinyl acetate at any particular time, i. e., with such plasticized films the outer coating of vinyl acetate lacquer need not be applied when the tackiness of the hydrolyzed ethyl silicate layer is disappearing but at any desired time interval thereafter. This is particularly advantageous in production methods.

Although the amount of vinyl acetate used for plasticizing the hydrolyzed ethyl silicate may be varied considerably, we have found that satisfactory results are obtained by using equivalent amounts of the hydrolyzed ethyl silicate solution and of vinyl acetate polymer solution. A satisfactory solution for producing the hydrolyzed silicate film is made from 10 per cent each of hydrolyzed ethyl silicate and vinyl acetate polymer with 80 per cent of ethyl alcohol (95 per cent). Such a film plasticized with vinyl acetate does not form a satisfactory bond with mortar, further showing the necessity for the use of the outer film of vinyl acetate polymer.

The block or other article is prepared for use by applying to the dried hydrolyzed ethyl silicate film an overlying layer of vinyl acetate polymer solution. After it has dried the article is ready to be laid up with mortar. Preferably the vinyl acetate polymer which constitutes the outer layer of the coating is applied in the form of a strong solution, say 30 per cent, in ethyl alcohol or other suitable solvent. Although various grades of vinyl acetate polymer may be used, we now prefer the 7-second variety because stronger solutions may be made from it than from the more highly polymerized products.

The layers of the coating may be applied in any desired manner, as by painting, spraying, dipping, roller coating, or the like. The films may be formed by allowing the solutions to dry in place, no heating being needed. Should it be desirable to do so, however, the articles may be heated after the application of the solution forming either or both layers, say to 110° C.

Such coatings possess satisfactory hardness, flexibility and strength, they adhere satisfactorily to the face of the article under wet and dry conditions, and they produce adequately strong mortar bonds. As evidencing this, glass blocks provided with the two-layer coating of this invention were tested to determine the modulus of rupture of the mortar bonds produced with such coatings. These tests showed a modulus of rupture of 150 pounds per square inch dry and 50 pounds per square inch wet. Similar tests made without the silicate layer of this invention gave the same dry strength but the modulus was but 20 pounds per square inch wet, showing the high resistance to moisture which is characteristic of bonds made in accordance with the invention.

Hydrolysis of the silicate ester is apparently necessary in the practice of the invention as appears from the fact that coatings produced from mixtures of vinyl acetate and unhydrolyzed ethyl silicate exhibited no better wet adherence than coatings made from vinyl acetate alone.

The invention is illustrated in the accompanying drawing in which Fig. 1 represents a wall structure made from glass blocks 1 laid up in courses, as shown, with mortar 2, the contiguous, or mortar-bearing, faces of the glass blocks 1 being provided with a coating comprising a layer, or film, 3 formed from a solution of hydrolyzed ethyl silicate and vinyl acetate polymer to which there is applied a layer 4 of vinyl acetate polymer. As appears from Fig. 2, mortar 2 is applied directly to film 4.

It will be understood that various modifications are permissible in the practice of the invention. Thus, although the outer layer of the coating is preferably vinyl acetate polymer it might be made from other lacquers or synthetic resins or mixtures of such materials provided they adhere satisfactorily to the underlying layer and to mortar. For instance, vinyl acetals might be used although in general they are not quite so satisfactory as vinyl acetate. Also, the coatings, particularly the hydrolyzed silicate layer, may be colored, if desired, by admixture with pigment or dye. Also, although the invention has been described with particular reference to structural glass units, it is applicable to articles not consisting of glass but having at least their mortar-bearing surfaces glazed so that mortar does not adhere satisfactorily thereto. Similarly, the blocks 1 of Fig. 1 are shown schematically merely to illustrate the invention applied to glass blocks, and any of the various types or structures of such structural units may be treated according to the invention. Again, although it is necessary to apply the two-layer coating of the invention only to the mortar-bearing surfaces, it will be understood that other parts, or the entire unit, may be coated similarly if that be desirable or expedient for any reason.

Moreover, it is now preferred to form the outer film by the use of a solution of the polymer, which forms the film by evaporation and without the necessity for heating to induce polymerization which would be necessary if a solution of vinyl acetate monomer were used. If desirable for any reason, however, the monomer might be used.

According to the provisions of the patent statutes, we have explained the principle and mode of practicing our invention and have illustrated and described what we now consider to represent its best embodiment. However, we desire to have it understood that, within the scope of the appended claims, the invention may be practiced otherwise than as specifically illustrated and described.

We claim:

1. A structure comprising structural units having at least their contiguous faces glazed, and mortar between said contiguous faces, said faces having applied thereto a coating comprising a layer of hydrolyzed silicate ester, and an adherent overlying layer of synthetic resin, said coating being characterized by sustained adherence under wet and dry conditions to said units and said mortar.

2. A structure comprising structural units having at least their contiguous faces glazed, and mortar between said contiguous faces, said faces having applied thereto a coating comprising a layer of hydrolyzed ethyl silicate and a plasticizer, and an adherent overlying layer of at least one synthetic resin of the class consisting of vinyl acetate and vinyl acetals in contact with said mortar, said coating being characterized by good adherence under wet and dry conditions to said units and said mortar.

3. A structure comprising structural units having at least their contiguous faces glazed, and mortar between said contiguous faces, said faces having applied thereto a coating comprising a layer of hydrolyzed ethyl silicate and a plasticizer of the group consisting of polymers of vinyl acetals and of vinyl acetate, and an overlying layer of at least one member of the group consisting of polymers of vinyl acetals and of vinyl acetate in contact with said mortar, said coating being characterized by good adherence under wet and dry conditions to said units and said mortar.

4. A wall structure composed of glass blocks arranged in courses, the contiguous faces of said blocks being provided with an adherent coating comprising a layer of hydrolyzed alkyl silicate ester and a plasticizer of the group consisting of polymers of vinyl acetals and of vinyl acetate applied directly to the glass, and an adherent overlying layer of at least one member of the group consisting of polymers of vinyl acetals and of vinyl acetate, and mortar disposed between said blocks in contact with said vinyl acetate layer.

5. A wall structure according to claim 4, said plasticizer being vinyl acetate polymer, and said coating being vinyl acetate polymer.

6. A wall structure composed of glass blocks arranged in courses, the contiguous faces of said blocks being provided with an adherent coating comprising a layer of hydrolyzed ethyl silicate applied directly to the glass, and an adherent overlying layer of vinyl acetate polymer, and mortar disposed between said blocks in contact with said vinyl acetate layer.

7. As a new article of manufacture, a glass building block provided with a coating comprising a layer of hydrolyzed ethyl silicate and a plasticizer applied directly to the glass, and an overlying layer of vinyl acetate polymer, said coating being characterized by maintained adherence to the glass in the presence of moisture and by forming a strong bond with mortar applied to its exposed surface.

8. As a new article of manufacture, a glass building block provided with a coating comprising a layer of hydrolyzed ethyl silicate and a plasticizer applied directly to the glass, and an overlying layer of vinyl acetate polymer, said coating being characterized by maintained adherence to the glass in the presence of moisture and by forming a strong bond with mortar applied to its exposed surface.

9. As a new article of manufacture, a glass building block provided with a coating comprising a layer of hydrolyzed ethyl silicate and at least one plasticizer of the group consisting of polymers of vinyl acetals and of vinyl acetate applied directly to the glass, and an overlying layer of at least one member of the group consisting of polymers of vinyl acetate and of vinyl acetals, said coating being characterized by maintained adherence to the glass in the presence of moisture and by forming a strong bond with mortar applied to its exposed surface.

10. As a new article of manufacture, a glass building block provided with a coating comprising a layer of hydrolyzed ethyl silicate and vinyl acetate polymer plasticizer applied directly to the glass, and an overlying layer of vinyl acetate polymer, said coating being characterized by maintained adherence to the glass in the presence of moisture and by forming a strong bond with mortar applied to its exposed surface.

11. In a method of forming a structure from glass blocks and mortar, the steps comprising applying to the mortar-bearing surfaces of the blocks a film of hydrolyzed silicate ester, then applying thereover a film of vinyl acetate polymer, and applying the mortar directly to said vinyl acetate film.

12. In a method of forming a structure from glass blocks and mortar, the steps comprising applying to the mortar-bearing surfaces of the blocks a coating of hydrolyzed ethyl silicate and a plasticizer, then applying thereover a coating of vinyl acetate polymer, and applying the mortar directly to said vinyl acetate coating.

13. In a method of forming a structure from glass blocks and mortar, that step comprising applying to the mortar-bearing surfaces of the blocks a coating of hydrolyzed ethyl silicate and vinyl acetate polymer, then applying thereover a coating of vinyl acetate polymer, and applying the mortar directly to said vinyl acetate coating.

ROB R. McGREGOR.
EARL L. WARRICK.